Figure 1:
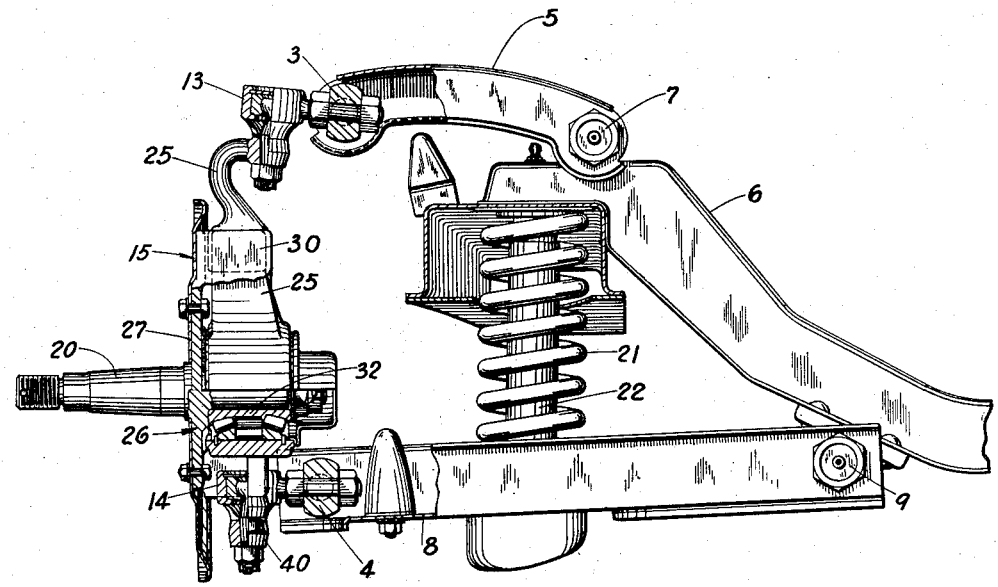

April 14, 1959 N. VON RUCKER 2,882,065
SUSPENSION SYSTEM FOR VEHICLES
Filed Nov. 7, 1955

INVENTOR.
Nikolaus Von Rucker
BY
Wayne B. Easton

United States Patent Office 2,882,065
Patented Apr. 14, 1959

2,882,065

SUSPENSION SYSTEM FOR VEHICLES

Nikolaus von Rucker, South Bend, Ind., assignor to Studebaker-Packard Corporation, Detroit, Mich., a corporation of Michigan Application November 7, 1955, Serial No. 545,217

10 Claims. (Cl. 280—96.2)

This invention relates to vehicle wheel mountings and especially to wheel mountings of the independent wheel suspension type.

While the invention is applicable to both the front and rear wheels of vehicles, it is illustrated herein as being embodied in a front wheel suspension.

The suspensions to which the invention particularly pertains is known as the double wishbone, knee action type which is based upon what is generally called a parallelogram linkage. The four sides of the linkage are a stationary side formed by the frame of the vehicle, an upper wishbone, a movable side which is the wheel supporting structure, and a lower wishbone. The four sides are joined to each other by pivotal connections lying along four axes which are parallel to each other and this linkage accommodates rising and falling of a wheel connected to the wheel carrying structures independently of the other wheels of the vehicle. Resilient means such as a helical coil suspension spring or a torsion bar arrangement is disposed between an abutment portion on the frame and the lower wishbone to provide a resilient connection between the frame and a wheel of the vehicle which resiliently resists vertical movement of the wheel relative to the frame.

The above referred to prior art suspension has at least one disadvantage or drawback and the present invention is directed to an improvement of suspensions of this type in which the drawback in question is not present. In general, the forces normally imparted from a wheel to its wheel carrying structure when the wheel encounters irregularities in the road such as bumps and holes have both horizontal and vertical components. A disadvantage or drawback of the conventional double wishbone type suspension is that the parallelogram linkage and the resilient means or spring associated therewith do not function to resiliently absorb the horizontal force components imparted to the wheel carrying structure but instead merely function to transmit the horizontal force components directly to the frame of the vehicle.

The conventional double wishbone suspension is therefore only capable of resiliently resisting or absorbing vertical force components which are imparted to the wheel carrying structure. In such a suspension the pneumatic tire on the wheel is relied upon to resiliently absorb a portion of the horizontal force components. The balance or remainder of the horizontal force components are transmitted through the wishbones to the frame of the vehicle but are shunted around the resilient means or spring and accordingly are not resiliently absorbed by the suspension structure. A main object of the invention is to provide a new and improved double wishbone type suspension which functions to resiliently absorb both horizontal and vertical force components which are imparted to the wheel carrying structure of the suspension.

Another object of the invention is to provide a new and improved suspension of the type referred to which improves the steering characteristics of the steering apparatus of a vehicle in which the suspension system of the present invention is embodied.

In general, the manner in which the objects of the invention are accomplished is by forming the wheel carrying structure into two main parts or links, there being provided a lower link between the lower wishbone and the axle of the wheel and an upper link between the axle of the wheel and the upper wishbone which is angularly movable relative to the lower link. With this construction the horizontal force components imparted to the axle of the wheel causes the links to move angularly relative to each other and concomitantly the wishbones are caused to move towards each other. Such movement of the wishbones is resiliently resisted instead of being transmitted directly to the frame of the vehicle.

Other objects of the invention will become apparent from the following specification, the drawing relating thereto, and the appended claims.

Figure 2:
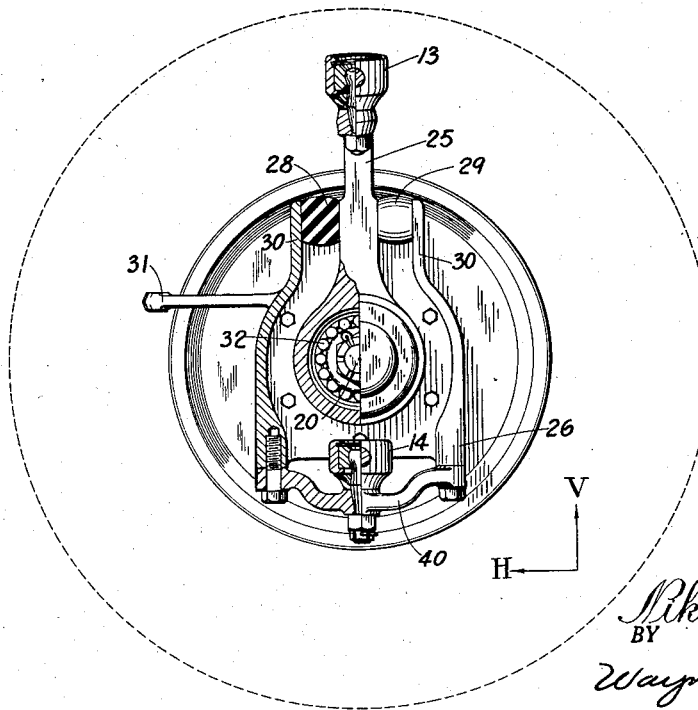

In the drawing:

Fig. 1 is a front elevational view, partly in section, of a front wheel suspension arrangement embodying the present invention; and Fig. 2 is a view, partly in section, taken on line II—II of Fig. 1.

Referring to the drawing, there is shown a double wishbone type independent suspension which embodies the present invention. The suspension structure includes an upper lever arm 5 connected at its inner end to a vehicle frame member 6 with a pivotal connection 7 and a somewhat longer lower lever arm 8 connected at its inner end to frame member 6 with a pivotal connection 9. The pivotal connections 7 and 9 are about horizontal axes and are in vertically spaced arrangement with the upper pivotal connection 7 being positioned closer to the wheel of the vehicle. The outer ends of lever arms 5 and 8, which ends are in general vertical alignment, are attached by means of universal type joints 13 and 14 to opposite ends of a wheel supporting structure which is indicated generally by reference numeral 15. Universal joint members 13 and 14 are connected respectively to lever arms 5 and 8 by means of pivotal or hinge connections 3 and 4 although these may be solid or rigid connections in other embodiments of the invention if desired.

Although lever arms 5 and 8 are each illustrated as having the conventional "wishbone" type construction, such construction is not essential to the invention. Similarly, although universal joints 13 and 14 are each preferably of a ball and socket type construction, any type of connection which provides for a universal or swiveling movement of wheel supporting structure 15 relative to lever arms 5 and 8 respectively may be utilized within the scope of the invention.

A wheel (not shown) is rotatably mountable on an axle 20, which is a part of wheel supporting structure 15, and the vertical movement of wheel supporting structure 15 relative to frame 6 of the vehicle is resiliently resisted by resilient means which is illustrated herein as being a helical coil spring 21. Spring 21 is illustrated as being disposed between the lower wishbone 8 and the underside of frame 6 but other positions for the resilient means would be satisfactory so long as it functions to resiliently resist vertical movement of wheel supporting structure 15 relative to frame 6.

A shock absorber 22 of any suitable construction is associated with spring 21 and is pivotally connected at one end thereof to the frame 6 and at the other end to lower wishbone 8.

In accordance with the invention, wheel supporting structure 15 comprises upper and lower links 25 and 26 and a spindle or axle 20, upon which a wheel is rotatably mountable, is provided. Upper link 25 is pivotally connected at one end thereof to axle 20 by means of a roller bearing 32 and is connected at the other end thereof to the upper wishbone 5 by means of universal joint 13. Lower link 26 is rigidly connected at one end thereof to axle 20, and may be integral therewith if desired, and connected at the other end thereof to lower wishbone 8 by means of universal joint 14. The connecting of link 26 and joint 14 is facilitated by a saddle shaped member 40 which is fastened to link member 26 by bolts. The universal joint member 14 is attached to member 40 by a stud and nut fastener as shown. An annularly shaped brake backing plate 27, which surrounds axle 20 and is fastened to lower link 26, may also be provided if desired.

With this construction the horizontal force components H of forces imparted to axle 20 through a wheel rotatably mounted thereon, when the wheel encounters irregularities in the roadway, cause links 25 and 26 to move angularly relative to each other about axle 20 in a plane normal to axle 20. Link 26 and axle 20 in effect pivot about universal joint 14 and link 25 pivots about universal joint 13 so that axle 20 is movable in a direction towards the rear of the vehicle relative to wishbones 5 and 8. Concomitantly the wishbones 5 and 8 are caused to move towards each other. As this movement of wishbones 5 and 8 towards each other is resisted by spring 21, it is seen that the horizontal force components H of forces imparted to axle 20 are resiliently resisted by spring 21 instead of being transmitted directly to frame 6 by being by-passed around spring 21.

As the horizontal force components H, which cause axle 20 to move towards the rear of the vehicle relative to wishbones 5 and 8, are resiliently resisted by spring 21, the restoring force of spring 21 subsequently acts to force axle 20 in the opposite direction, relative to wishbones 5 and 8, towards the front of the vehicle. To prevent overtravel of axle 20 in both the forward and backward directions, and to quickly stop the vibrating of links 25 and 26 relative to each other, shock absorbing, vibration damping means such as rubber bumpers 28 and 29 are attached as by bonding to one of the links, illustrated as being attached to lower link 26, which are adapted to engage the other link 25 in abutting engagement. Rubber bumpers 28 and 29 in their attached positions function to limit the travel of axle 20 towards the front and rear of the vehicle, relative to wishbones 5 and 8, by what may be termed a snubbing action which also prevents the continuous oscillation of axle 20 relative to wishbones 5 and 8. Therefore, after the restoring force of spring 21 causes axle 20 to move towards the front of the vehicle relative to wishbones 5 and 8, the spring 21 and bumpers 28 and 29 cause axle 20 to be maintained in its normal position, with the links 25 and 26 in linear alignment, until the wheel of the vehicle is again subjected to horizontal force components which cause axle 20 to move towards the rear of the vehicle relative to wishbones 5 and 8 against the resilient resistance of spring 21.

To facilitate mounting of rubber bumpers 28 and 29 link 26 extends above axle 20 and is provided with flanges 30 to which bumpers 28 and 29 are in abutting engagement.

An arm 31 which facilitates steering of the wheel is attached to one of the links and is illustrated as being attached to lower link 26 and extends towards the front end of the vehicle. Arm 31 may be attached to the rear end side of link 25 or 26 if desired, however. Arm 31 is attachable in a suitable manner to a conventional steering device such as a bell crank lever (not shown) attached to the frame of the vehicle. The providing of universal joints 13 and 14 permits turning of wheel carrying structure 15 and axle 20 about a generally vertical axis which extends through universal joints 13 and 14 of the wheel carrying structure 15.

The present invention has been found to improve the steering of a vehicle in which it was installed over rough roadways. This is believed to be attributable to the fact that the horizontal force components of the forces transmitted to the vehicle from the road are absorbed by spring 21 rather than being transmitted to the frame of the vehicle and to the steering mechanism. In operation, the horizontal force components imparted by a bump moves a wheel mounted on axle 20 to the rear so that axle 20 pivots about the lower ball center 14. Axle 20 tends to travel in an arc about the lower ball center 14 but cannot because the axle remains the same distance above the road surface, excluding tire deflection, and accordingly the lower arm 8 is moved upward against the resistance of spring 21. The additional energy stored in the spring 21 returns the system to its static condition after passing over the bump. Rubber bumpers 28 and 29 mounted to lower link 26 and contacting upper link 25, provide additional spring force. The use of rubber bumpers 28 and 29 permits spring 21 to be no stiffer than the counterpart of spring 21 in a conventional suspension system.

The present invention also permits the use of a positive caster which gives the driver of the vehicle more directional stability and a much better road sense. Furthermore, the present invention permits the axle of the wheel to move in a horizontal plane and this movement of the axle suppresses gyroscopic forces and tends to eliminate the effects of precession.

The invention may be embodied in other specific forms without departing from the spirit or essential characteristics thereof. The present embodiment of the invention is therefore to be considered in all respects as illustrative and not restrictive, the scope of the invention being indicated by the appended claims rather than by the foregoing description, and all changes which come within the meaning and range of equivalency of the claims are therefore intended to be embraced therein.

It is claimed and desired to secure by Letters Patent:

1. In a vehicle wheel suspension, a frame, lever arm means including upper and lower lever arms pivotally connected at their inner ends to said frame about vertically spaced horizontal axes, a first link connected by a universal joint to the outer end of said lower lever arm and having a wheel axle rigidly attached thereto at a point between said lever arms, a second link connected by a universal joint to the outer end of said upper lever arm and being operably connected to said wheel axle for pivotal movement relative thereto in a plane normal to the axis of said axle, and resilient means operably disposed between said lever arm means and said frame to provide resilient resistance to upward movement of said lower lever arm.

2. In a vehicle wheel suspension, a frame, lever arm means including upper and lower lever arms pivotally connected at their inner ends to said frame about vertically spaced horizontal axes, a first link connected by a universal joint to one of said lever arms and having a wheel axle rigidly attached thereto at a point between said lever arms, a second link connected by a universal joint to the other of said lever arms and being operably connected to said wheel axle for pivotal movement relative thereto in a plane normal to the axis of said axle, and resilient means operably disposed between said lever arm means and said frame to provide resilient resistance to upward movement of said lower lever arm.

3. In a vehicle wheel suspension, a frame, lever arm means including upper and lower lever arms pivotally connected at their inner ends to said frame about vertically spaced horizontal axes, a first link connected by a universal joint to one of said lever arms and having a wheel axle rigidly attached thereto at a point between said lever arms, a second link connected by a universal joint to the other of said lever arms and being operably connected to said wheel axle for pivotal movement relative thereto in a plane normal to the axis of said axle, resilient means operably disposed between said lever arm means and said frame to provide resilient resistance to upward movement of said lower lever arm, and resilient abutment means attached to one of said links and engageable with the other of said links for limiting movement of said axle towards the front and rear of said vehicle relative to said lever arm means.

4. In a vehicle wheel suspension, a frame, lever arm means pivotally connected to said frame about horizontal axes, wheel carrying means attached to said lever arm means, a wheel axle mounted on said wheel carrying means between said horizontal axes, and resilient means operably disposed between said lever arm means and said frame to provide resilent resistance to upward movement of said wheel carrying means relative to said frame, said wheel carrying means comprising two links operably connected for pivotal movement relative to each other in a plane normal to the axis of said axle and each link having one end thereof connected by a universal joint to said lever arm means.

5. In a vehicle wheel suspension, a frame, lever arm means pivotally connected to said frame about horizontal axes, wheel carrying means attached to said lever arm means, a wheel axle mounted on said wheel carrying means between said horizontal axes, and resilient means operably disposed between said lever arm means and said frame to provide resilient resistance to upward movement of said wheel carrying means relative to said frame, said wheel carrying means comprising two links operably connected for pivotal movement relative to each other in a plane normal to the axis of said axle and each link having one end thereof connected by universal joints to said lever arm means, said links being operable to accommodate movement of said axle in a horizontal direction relative to said lever arm means and said resilient means being operable to resiliently resist said horizontal movement of the axle.

6. In a vehicle wheel suspension, a frame, lever arm means including upper and lower lever arms pivotally connected at their inner ends to said frame about vertically spaced horizontal axes, wheel carrying means attached to and disposed between the outer ends of said lever arms, a wheel axle mounted on said wheel carrying means between said lever arms, and resilient means operably disposed between said lever arm means and said frame to provide resilient resistance to upward movement of said wheel carrying means relative to said frame, said wheel carrying means comprising one link having one end thereof operably connected to said wheel axle for pivotal movement relative thereto in a plane normal to the axis of said axle and a second link rigidly attached to said axle, said links having end portions connected respectively by universal joints to said upper and lower lever arms.

7. In a vehicle wheel suspension, a frame, lever arm means pivotally connected to said frame about horizontal axes, wheel carrying means attached to said lever arm means, a wheel axle mounted on said wheel carrying means between said lever arms, resilient means operably disposed between said lever arm means and said frame to provide resilient resistance to upward movement of said wheel carrying means relative to said frame, said wheel carrying means comprising two links operably connected for pivotal movement relative to each other in a plane normal to the axis of said axle and said links being connected respectively by universal joints to said lever arm means, and means for limiting movement of said axle towards the front and rear of said vehicle relative to said lever arm means.

8. In a vehicle wheel suspension, a frame, lower arm means including upper and lower lever arms pivotally connected to said frame about vertically spaced horizontal axes, wheel carrying means attached to and disposed between the outer ends of said lever arms, a wheel axle mounted on said wheel carrying means between said lever arms, resilient means operably disposed between said lever arm means and said frame to provide resilient resistance to upward movement of said wheel carrying means relative to said frame, said wheel carrying means comprising two links connected for pivotal movement relative to each other in a plane normal to the axis of said axle and said links being connected respectively by universal joints to said lever arm means, and means attached to one of said links and engageable with the other of said links for limiting movement of said axle towards the front and rear of said vehicle relative to said lever arm means.

9. In a vehicle wheel suspension, a frame, lever arm means including upper and lower lever arms pivotally connected at their inner ends to said frame about vertically spaced horizontal axes, the pivotal connection of said lower lever arm being disposed closer to the longitudinal center line of said frame than the pivotal connection of said upper lever arm, generally vertically disposed wheel carrying means attached to and extending between the outer ends of said lever arms, said ends of said lever arms being in general vertical alignment, a wheel axle mounted on said wheel carrying means between said lever arms, and resilient means operably disposed between said lever arm means and said frame to provide resilient resistance to upward movement of said wheel carrying means relative to said frame, said wheel carrying means comprising two links operably connected to each other for relative pivotal movement in a plane normal to the axis of said axle and connected respectively by universal joints to said upper and lower lever arms, and resilient abutment means attached to one of said links and engageable with the other of said links for limiting movement of said axle towards the front and rear of said vehicle relative to said lever arm means.

10. In a vehicle wheel suspension, a frame, lever arm means pivotally connected to said frame about horizontal axes, wheel carrying means attached to said lever arm means, a wheel axle mounted on said wheel carrying means between said horizontal axes, resilent means operably disposed between said lever arm means and said frame to provide resilient resistance to upward movement of said wheel carrying means relative to said frame, said wheel carrying means comprising two links operably connected for pivotal movement relative to each other in a plane normal to the axis of said axle each link having one end thereof connected by a universal joint to said lever arm means, and steering means attached to at least one of said links to effect rotation of said wheel carrying means about an axis extending through said universal joints.

References Cited in the file of this patent

UNITED STATES PATENTS 2,664,297    Booth _____ Dec. 29, 1953

FOREIGN PATENTS 895,857    Germany _____ Nov. 5, 1953